(12) United States Patent
Kandukuri Narayan et al.

(10) Patent No.: US 8,467,464 B2
(45) Date of Patent: Jun. 18, 2013

(54) APPARATUS, METHODS, AND ARTICLES OF MANUFACTURE FOR ADAPTIVE POWER CONTROL

(75) Inventors: Sunil K. Kandukuri Narayan, San Diego, CA (US); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/408,346

(22) Filed: Mar. 20, 2009

(65) Prior Publication Data

US 2012/0147795 A1   Jun. 14, 2012

Related U.S. Application Data

(60) Provisional application No. 61/040,566, filed on Mar. 28, 2008.

(51) Int. Cl.
  *H04K 1/10* (2006.01)
(52) U.S. Cl.
  USPC ........................................................ 375/260
(58) Field of Classification Search
  USPC ... 375/260, 296, 297; 370/208, 210; 330/149; 455/114.3
  See application file for complete search history.

(56) References Cited

U.S. PATENT DOCUMENTS

| 6,230,022 | B1 | 5/2001 | Sakoda et al. |
| 6,535,723 | B1 | 3/2003 | Jiang et al. |
| 2004/0052235 | A1 | 3/2004 | Foschini |
| 2005/0113041 | A1 | 5/2005 | Polley et al. |
| 2007/0190952 | A1* | 8/2007 | Waheed et al. ............ 455/114.3 |

(Continued)

FOREIGN PATENT DOCUMENTS

| JP | 11196043 A | 7/1999 |
| JP | 2002300047 A | 10/2002 |
| JP | 2006524456 A | 10/2006 |
| WO | 2004086651 A1 | 10/2004 |

OTHER PUBLICATIONS

Ericsson et al: "Draft TS 26.290 v.1.1.0: Extended AMR Wideband codec; Transcoding functions" 3GPP Draft; S4-040485_26290-110, 3rd Generation Partnership Project (3GPP), Mobile Competence Centre ; 650, Route Des Lucioles ; F-06921 Sophia-Antipolis Cedex ; France, vol. SA WG4, No. Prague, Czech Republic; 20040816, Aug. 12, 2004, XP050286999 p. 29-p. 40; figure 6.

(Continued)

*Primary Examiner* — Young T. Tse
(74) *Attorney, Agent, or Firm* — Abdollah Katbab (57) ABSTRACT

In embodiments, a first wireless device generates symbols for transmission to another wireless device. Adaptive power control is applied to the transmissions, for example, at symbol or frame boundaries. When a transmit power gain adjustment exceeds a threshold, all or part of the gain adjustment may be performed on the generated symbols before the symbols are combined in an overlap-and-add process. Part of the gain adjustment may also be performed through adjustment of the power amplifier. When the gain adjustment does not exceed the threshold, all of the gain adjustment may be performed through adjustment of the power amplifier. Performing gain adjustment before the overlap-and-add process results in a lower spectral spread of the transmitted waveform and improved bandwidth utilization efficiency. In embodiments, the power adjustment techniques are used in FDD/OFDM systems or other systems where a plurality of symbols or frames is transmitted substantially continuously.

38 Claims, 6 Drawing Sheets

U.S. PATENT DOCUMENTS

2008/0118001 A1* 5/2008 Chan et al. .................. 375/297
2009/0245409 A1 10/2009 Kandukuri Narayan et al.
2009/0285329 A1* 11/2009 Matsuoka et al. ........... 375/297

OTHER PUBLICATIONS

European Search Report—EP10190911, Search Authority—Munich Patent Office, Jan. 13, 2011.

International Search Report &Written Report—PCT/US2009/038471, International Search Authority—European Patent Office—Aug. 26, 2009.

Samsung: "Asynchronous RACH Preamble Design" 3GPP Draft; RI-062515, 3rd Generation Partnership Project (SGPP), Mobile Competence Centre ; 650, Route Des Lucioles ; F-06921 Sophia-Antipolis Cedex ; France, vol. RAN WGI, No. Seoul, Korea; 20061009, Oct. 3, 2006, XP050103039 paragraph [02.2]—paragraph [02.4];figures 3,5.

International Search Report and Written Opinion—PCT/US2009/038471—ISA/EPO—Aug. 26, 2009.

Samsung: "Asynchronous RACH Preamble Design" 3GPP Draft; R1-062515, 3rd Generation Partnership Project (SGPP), Mobile Competence Centre; 650, Route Des Lucioles; F-06921 Sophia-Antipolis Cedex; France, vol. RAN WGI, no. Seoul, Korea; 20061009, Oct. 3, 2006, XP050103039 paragraph [02.2]—paragraph [02.4];figures 3,5.

Taiwan Search Report—TW098110242—TIPO—Jul. 27, 2012.

* cited by examiner

APPARATUS, METHODS, AND ARTICLES OF MANUFACTURE FOR ADAPTIVE POWER CONTROL

CLAIM OF PRIORITY UNDER 35 U.S.C. §119

The present Application for Patent claims priority to Provisional Application No. 61/040,566. entitled "ADAPTIVE POWER CONTROL FOR AN OFDMA FDD SYSTEM," filed on Mar. 28, 2008, and assigned to the assignee hereof and hereby expressly incorporated by reference herein.

BACKGROUND

1. Field

The present invention relates generally to communications. More particularly, in aspects the invention relates to adaptive power control in wireless communication systems.

2. Background

Modern wireless communication systems are widely deployed to provide various types of communication applications, such as voice and data applications. These systems may be multiple access systems capable of supporting communication with multiple users by sharing the available system resources (e.g., spectrum and transmit power). Examples of multiple access systems include code division multiple access (CDMA) systems, time division multiple access (TDMA) systems, frequency division multiple access (FDMA) systems, time division duplexing (TDD) systems, frequency division duplexing (FDD) systems, $3^{rd}$ generation partnership project long term evolution (3GPP LTE) systems, and orthogonal frequency division multiple access (OFDMA) systems. There are also point-to-point systems, peer-to-peer systems, and wireless local area networks (wireless LANs).

Generally, a wireless multiple access communication system can simultaneously support communications with multiple wireless terminals. Each terminal communicates with one or more base transceiver stations (BTSs or base stations) via transmissions on the forward and reverse links. The forward link or downlink refers to the communication link from a base transceiver station to a terminal, and the reverse link or uplink refers to the communication link from a terminal to a base transceiver station. Both forward and reverse communication links may be established via a single-in-single-out, multiple-in-single-out, single-in-multiple-out, or a multiple-in-multiple-out (MIMO) communication technique, depending on the number of transmitting and receiving antennae used for the particular link.

MIMO systems are of particular interest because of their relatively higher data rates, relatively longer coverage range, and relatively more reliable transmission of data. A MIMO system employs multiple ($N_T$) transmit antennae and multiple ($N_R$) receive antennae for data transmission. A MIMO channel formed by the $N_T$ transmit and $N_R$ receive antennae may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensions created by the multiple transmit and receive antennae are used.

MIMO techniques may support both TDD and FDD systems. In a TDD system, the forward and reverse link transmissions are in the same frequency band, so that the reciprocity principle allows the estimation of the forward link channel from the reverse link channel, and vice versa. In an FDD system, different frequency bands may be used for forward and reverse link transmissions, making estimation of the reverse link channel from the forward link channel generally less reliable.

In many wireless communication systems, and particularly multiple access wireless communication systems, over-the-air power control is an important aspect of design. Because transmissions from one access terminal constitute interference for other terminals, it is desirable to keep the power of the transmissions to a value sufficient for reliable link communications, but not much higher. At the same time, access terminals are typically battery operated, so battery life may be an important performance characteristic. For this reason as well, it is desirable to limit the transmitted power and the associated battery power consumption to a level not much higher than that needed for reliable communications. This goal is often achieved through adaptive power control. Adaptive power control may be open loop, for example, where a wireless access terminal estimates a reverse link channel from an estimate of a forward link channel obtained from a pilot signal. Adaptive power control may also be close loop, for example, where an access terminal receives power control commands from a base transceiver station of a radio network. Exemplary method of power control in CDMA systems are described in U.S. Pat. No. 5,056,109; and in United States Patent Application Publication Number 2005/0197150. Both patent documents identified in the immediately preceding sentence are assigned to the assignee of the present invention and are incorporated by reference as if fully set forth herein, including figures, claims, and tables (if any).

Because access terminals are typically mobile, their operating environment is constantly changing in various respects. Thus, noise, interference, attenuation, distortion, fading, and other physical channel characteristics may be fast-changing, sometimes necessitating abrupt adjustments of the transmitted power. For systems that operate in a non-continuous manner over relatively short intervals, power adjustments may be made during breaks in transmissions. In certain TDMA systems, for example, the access terminal may transition from one transmit power level to another transmit power level during the time the access terminal is receiving and not transmitting. In other systems, such as certain FDD and OFDMA systems, power adjustments are made during continuous transmissions. These systems include Worldwide Interoperability for Microwave Access (WiMAX) systems, LTE systems, Ultra Mobile Broadband (UMB) systems, and IEEE 802.20 standard systems.

Relatively small power adjustments generally do not cause excessive spectral spread and its associated bandwidth utilization inefficiencies. Relatively large power adjustments, however, may cause excessive spectral spread and the accompanying bandwidth utilization inefficiencies.

A need thus exists in the art for apparatus, methods, and articles of manufacture that reduce spectral spread caused by large power fluctuations in power control settings.

SUMMARY

Embodiments disclosed herein may address one or more of the above stated needs by providing apparatus, methods, and articles of manufacture for selectively scaling symbols/frames before performing the overlap-and-add process, in order to adjust transmitted power level of a wireless device.

The steps include power scaling a first symbol by a first scaling factor to obtain a first scaled symbol, and a second symbol by a second scaling factor to obtain a second scaled symbol. The steps also include combining the first scaled symbol and the second scaled symbol into a combined signal by an overlap-and-add process, wherein the step of combining is performed after the step of power scaling. The steps further include adjusting at least one of the first scaling factor and the second scaling factor in response to at least one power control event (such as receiving a power control command from a network, or locally determining that a power adjustment in needed). The steps additionally include processing the combined signal to obtain a processed waveform having a first processed symbol corresponding to the first symbol and a second processed symbol corresponding to the second symbol. The processed waveform is then transmitted.

In an embodiment, a wireless communication method has a number of steps. The steps include comparing a power level adjustment value to a threshold. The steps also include power scaling a first symbol by a first scaling factor to obtain a first scaled symbol. The steps additionally include setting a second scaling factor equal to the first scaling factor if the power level adjustment value is not greater than the threshold, and setting the second scaling factor to an adjusted scaling factor if the power level adjustment value is greater than the threshold, the adjusted scaling factor being different from the first scaling factor. The steps further include power scaling a second symbol by the second scaling factor to obtain a second scaled symbol. The steps further include combining the first and second scaled symbols into a combined signal by an overlap-and-add process, wherein the means for combining operates on the first and second scaled symbols after power scaling of the first and second symbols. The steps further include converting the combined signal into an analog waveform. The steps further include setting gain of a power amplifier to a first power amplifier value and amplifying a portion of the analog waveform corresponding to the first scaled symbol with the power amplifier when the gain is set to the first power amplifier value to obtain a first amplified portion of the analog waveform. The steps further include setting the gain of the power amplifier to a second power amplifier value and amplifying a portion of the analog waveform corresponding to the second scaled symbol with the power amplifier when the gain is set to the second power amplifier value to obtain a second amplified portion of the analog waveform. The steps further include transmitting the first and second amplified portions, the step of transmitting resulting in transmission of the first amplified portion with a first power level and transmission of the second amplified portion with a second power level. In this method, the first scaling factor, the adjusted scaling factor, and the first and second power amplifier values are selected so that the change from the first power level to the second power level corresponds to the power level adjustment value, and the difference between the second power amplifier value and the first power amplifier value does not exceed a predetermined power amplifier difference value.

In an embodiment, a wireless device has at least one receiver, at least one transmitter, and at least one controller coupled to the at least one receiver and the at least one transmitter. The at least one controller is configured to perform a number of steps. The steps include power scaling a first symbol by a first scaling factor to obtain a first scaled symbol, and a second symbol by a second scaling factor to obtain a second scaled symbol. The steps also include combining the first scaled symbol and the second scaled symbol into a first combined signal by an overlap-and-add process, wherein the step of combining is performed after the step of power scaling. The steps additionally include adjusting at least one of the first scaling factor and the second scaling factor in response to at least one power control event. The steps further include processing the combined signal to obtain a processed waveform comprising a first processed symbol corresponding to the first symbol and a second processed symbol corresponding to the second symbol, and transmitting the processed waveform.

In an embodiment, a wireless device has at least one receiver, at least one transmitter, and at least one controller coupled to the at least one receiver and the at least one transmitter. The at least one controller is configured to perform a number of steps. The steps include comparing a power level adjustment value to a threshold. The steps also include power scaling a first symbol by a first scaling factor to obtain a first scaled symbol. The steps additionally include setting a second scaling factor equal to the first scaling factor if the power level adjustment value is not greater than the threshold, and setting the second scaling factor to an adjusted scaling factor if the power level adjustment value is greater than the threshold, the adjusted scaling factor being different from the first scaling factor. The steps further include power scaling a second symbol by the second scaling factor to obtain a second scaled symbol. The steps further include combining the first and second scaled symbols into a combined signal by an overlap-and-add process, wherein the means for combining operates on the first and second scaled symbols after power scaling of the first and second symbols. The steps further include converting the combined signal into an analog waveform. The steps further include setting gain of a power amplifier to a first power amplifier value and amplifying a portion of the analog waveform corresponding to the first scaled symbol with the power amplifier when the gain is set to the first power amplifier value to obtain a first amplified portion of the analog waveform. The steps further include setting the gain of the power amplifier to a second power amplifier value and amplifying a portion of the analog waveform corresponding to the second scaled symbol with the power amplifier when the gain is set to the second power amplifier value to obtain a second amplified portion of the analog waveform. The steps further include transmitting the first and second amplified portions, the step of transmitting resulting in transmission of the first amplified portion with a first power level and transmission of the second amplified portion with a second power level. In this embodiment, the first scaling factor, the adjusted scaling factor, and the first and second power amplifier values are determined so that the change from the first power level to the second power level corresponds to the power level adjustment value, and the difference between the second power amplifier value and the first power amplifier value does not exceed a predetermined power amplifier difference value.

In an embodiment, a machine-readable medium stores embedded instructions. When the instructions are executed by at least one controller of a wireless device, the instructions cause the wireless device to perform a number of steps. The steps include power scaling a first symbol by a first scaling factor to obtain a first scaled symbol, and a second symbol by a second scaling factor to obtain a second scaled symbol. The steps also include combining the first scaled symbol and the second scaled symbol into a first combined signal by an overlap-and-add process, wherein the step of combining is performed after the step of power scaling. The steps additionally include adjusting at least one of the first scaling factor and the second scaling factor in response to at least one power control event. The steps further include processing the combined signal to obtain a processed waveform comprising a first processed symbol corresponding to the first signal and a second processed symbol corresponding to the second symbol, and transmitting the processed waveform.

In an embodiment, a machine-readable medium stores embedded instructions. When the instructions are executed by at least one controller of a wireless device, the instructions cause the wireless device to perform a number of steps. The steps include comparing a power level adjustment value to a threshold. The steps also include power scaling a first symbol by a first scaling factor to obtain a first scaled symbol. The steps additionally include setting a second scaling factor equal to the first scaling factor if the power level adjustment value is not greater than the threshold, and setting the second scaling factor to an adjusted scaling factor if the power level adjustment value is greater than the threshold, the adjusted scaling factor being different from the first scaling factor. The steps further include power scaling a second symbol by the second scaling factor to obtain a second scaled symbol. The steps further include combining the first and second scaled symbols into a combined signal by an overlap-and-add process, wherein the means for combining operates on the first and second scaled symbols after power scaling of the first and second symbols. The steps further include converting the combined signal into an analog waveform. The steps further include setting gain of a power amplifier to a first power amplifier value and amplifying a portion of the analog waveform corresponding to the first scaled symbol with the power amplifier when the gain is set to the first power amplifier value to obtain a first amplified portion of the analog waveform. The steps further include setting the gain of the power amplifier to a second power amplifier value and amplifying a portion of the analog waveform corresponding to the second scaled symbol with the power amplifier when the gain is set to the second power amplifier value to obtain a second amplified portion of the analog waveform. The steps further include transmitting the first and second amplified portions, the step of transmitting resulting in transmission of the first amplified portion with a first power level and transmission of the second amplified portion with a second power level. In this embodiment, the first scaling factor, the adjusted scaling factor, and the first and second power amplifier values are such that the change from the first power level to the second power level corresponds to the power level adjustment value, and the difference between the second power amplifier value and the first power amplifier value does not exceed a predetermined power amplifier difference value.

In an embodiment, a wireless device includes means for power scaling a first symbol by a first scaling factor to obtain a first scaled symbol, and a second symbol by a second scaling factor to obtain a second scaled symbol. The device also includes means for combining the first scaled symbol and the second scaled symbol into a first combined signal by an overlap-and-add process, wherein the step of combining is performed after the step of power scaling. The device additionally includes means for adjusting at least one of the first scaling factor and the second scaling factor in response to at least one power control event. The device further includes means for processing the combined signal to obtain a processed waveform comprising a first processed symbol corresponding to the first symbol and a second processed symbol corresponding to the second symbol. The device further includes means for transmitting the processed waveform.

In an embodiment, a wireless device includes means for comparing a power level adjustment value to a threshold. The device also includes means for power scaling a first symbol by a first scaling factor to obtain a first scaled symbol. The device additionally includes means for setting a second scaling factor equal to the first scaling factor if the power level adjustment value is not greater than the threshold, and setting the second scaling factor to an adjusted scaling factor if the power level adjustment value is greater than the threshold, the adjusted scaling factor differing from the first scaling factor. The device further includes means for power scaling a second symbol by the second scaling factor to obtain a second scaled symbol. The device further includes means for combining the first and second scaled symbols into a combined signal by an overlap-and-add process, wherein the means for combining operates on the first and second scaled symbols after power scaling of the first and second symbols. The device further includes means for converting the combined signal into an analog waveform. The device further includes means for setting gain of a power amplifier to a first power amplifier value and amplifying a portion of the analog waveform corresponding to the first scaled symbol with the power amplifier when the gain is set to the first power amplifier value to obtain a first amplified portion of the analog waveform. The device further includes means for setting the gain of the power amplifier to a second power amplifier value and amplifying a portion of the analog waveform corresponding to the second scaled symbol with the power amplifier when the gain is set to the second power amplifier value to obtain a second amplified portion of the analog waveform. The device further includes means for transmitting the first and second amplified portions, the step of transmitting resulting in transmission of the first amplified portion with a first power level and transmission of the second amplified portion with a second power level. In this embodiment, the first scaling factor, the adjusted scaling factor, and the first and second power amplifier values are determined so that the change from the first power level to the second power level corresponds to the power level adjustment value, and the difference between the second power amplifier value and the first power amplifier value does not exceed a predetermined power amplifier difference value.

These and other aspects of the present invention will be better understood with reference to the following description, drawings, and appended claims.

DETAILED DESCRIPTION

In this document, the words "embodiment," "variant," and similar expressions are used to refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place may refer to a different apparatus, process, or article of manufacture. The expressions "alternative embodiment," "alternatively," and similar phrases may be used to indicate one of a number of different possible embodiments. The number of possible embodiments is not necessarily limited to two or any other quantity.

The word "exemplary" may be used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the invention.

"Tone" and "sub-carrier" are generally used interchangeably to indicate individual symbol-carrying tones in an orthogonal frequency division multiplexing (OFDM) or OFDMA system.

The techniques described in this document may be used for various wireless communication networks, including CDMA networks, TDMA networks, FDMA networks, OFDM and OFDMA networks, Single-Carrier FDM (SC-FDM) networks, Single-Carrier FDMA (SC-FDMA) networks, and other networks and peer-to-peer systems. The techniques may be used on both forward and reverse links. The terms "networks" and "systems" are often used interchangeably. A CDMA network may implement a radio technology such as Universal Terrestrial Radio Access (UTRA), cdma2000, and other technologies. UTRA networks include Wideband-CDMA (W-CDMA) and Low Chip Rate (LCR) networks. The cdma2000 designates IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, and other technologies. UTRA, E-UTRA, and GSM are parts of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 standard is described in documents from an organization named "3rd Generation Partnership Project 2" (3GPP2). Certain aspects of the techniques are described below for LTE, and LTE terminology may be used in the description below, but the techniques may be applicable to other standards and technologies.

Single carrier frequency division multiple access (SC-FDMA) is a communication technique which utilizes single carrier modulation and frequency domain equalization. SC-FDMA systems typically have similar performance and essentially the same overall complexity as OFDMA system. SC-FDMA signals have lower peak-to-average power ratio (PAPR) because of the technique's inherent single carrier structure. The SC-FDMA technique is attractive in many systems, especially in the reverse link communications where the lower PAPR benefits the mobile terminal in terms of transmit power efficiency. The SC-FDMA technique is currently a working assumption for the uplink multiple access scheme in 3GPP Long Term Evolution and Evolved UTRA.

Figure 1:
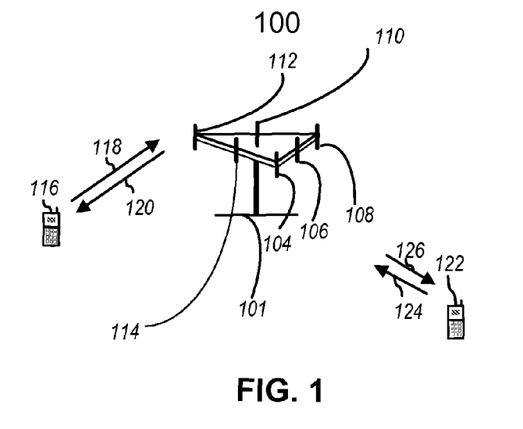
FIG. 1 illustrates selected elements of a multiple access wireless communication system which may be configured in accordance with embodiments described in this document.

A multiple access wireless communication system 100 according to one embodiment is illustrated in FIG. 1. An access point or a base transceiver station 101 includes multiple antenna groups, one group including antennae 104 and 106, another group including antennae 108 and 110, and an additional group including antennae 112 and 114. Although only two antennae are shown for each antenna group, more or fewer antennae may be included in any of the antenna groups. The BTS 101 may also include a single antenna group, or a single antenna. An access terminal (AT) 116 is in communication with the antennae 112 and 114, where antennae 112 and 114 transmit information to the access terminal 116 over a forward link 120, and receive information from the access terminal 116 over a reverse link 118. An access terminal 122 is in communication with antennae 106 and 108, where the antennae 106 and 108 transmit information to the access terminal 122 over a forward link 126 and receive information from the access terminal 122 over a reverse link 124. In an FDD system, each of the communication links 118, 120, 124 and 126 may use a different frequency for communications between access terminals and a particular antenna or antenna group, as well as different frequencies for forward and reverse links. For example, the forward link 120 may use a different frequency then that used by the reverse link 118, and a still another frequency than that used by the forward link 126. The use of different frequencies, however, is not necessarily a requirement of the invention.

Each group of antennae and the area in which it is designed to communicate is often referred to as a sector. As shown in FIG. 1, each of the antenna groups is designed to communicate to access terminals in a different sector of the area covered by the BTS 101.

In communications over forward links 120 and 126, the transmitting antennae of the BTS 101 use beamforming in order to improve the signal-to-noise ratio of the forward links for the different access terminals 116 and 122. Additionally, beamforming reduces interference for access terminals in neighboring cells, as compared to forward link transmissions through a single antenna to all its access terminals. Beamforming is also not necessarily a requirement of the invention.

An access point or a base transceiver station may be a fixed station used for communicating with the terminals and may also be referred to as a Node B or by some other terminology. An access terminal may also be called a mobile unit, user equipment (UE), a wireless communication device, terminal, mobile terminal, or some other terminology.

Figure 2:
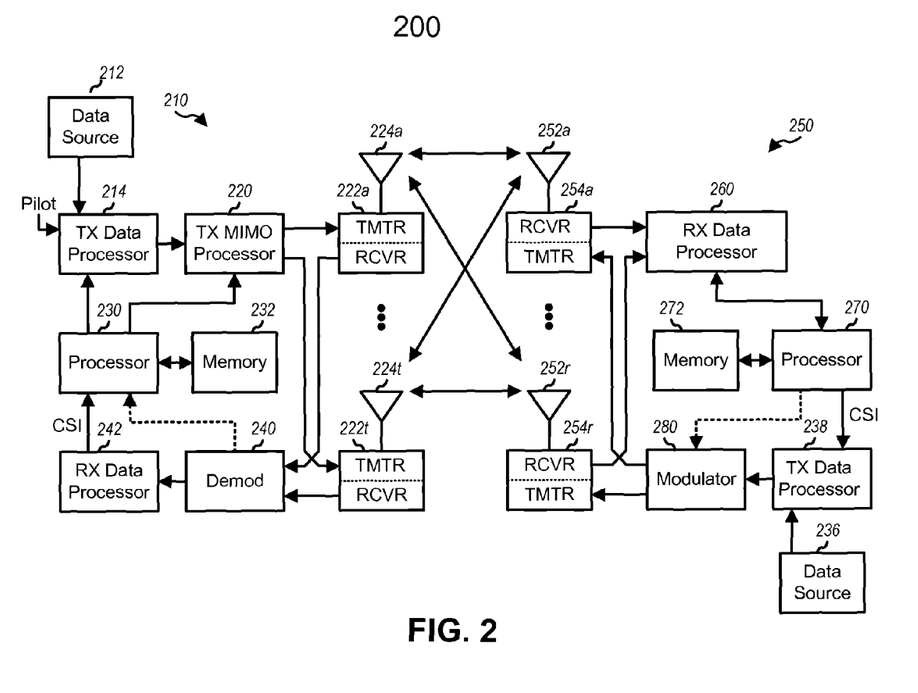
FIG. 2 illustrates in block diagram manner selected components of a wireless MIMO communication system that may be configured in accordance with embodiments described in this document.

FIG. 2 shows, in a block diagram form, selected components of an embodiment of a wireless MIMO communication system 200 that includes a transmitter system 210 of a base transceiver station (such as the BTS 101) and a receiver system 250 of an access terminal (such as the access terminal 116). At the transmitter system 210, traffic data for a number of data streams is provided from a data source 212 to a transmit (Tx) data processor 214.

In an embodiment, each data stream is transmitted over a respective transmit antenna or antenna group. The Tx data processor 214 formats, codes, and interleaves the traffic data for each data stream based on a particular coding scheme selected for that data stream to provide coded data. The coded data for each data stream may be multiplexed with pilot data using OFDM techniques. The pilot data is a known data pattern that is processed in a known manner and may be used at the receiver system to estimate the physical channel response or transfer function. The multiplexed pilot and coded data for each data stream are then modulated (i.e., symbol mapped) based on a particular modulation scheme selected for that data stream, to provide modulation symbols. The modulation scheme may be selected, for example, from binary phase-shift keying (BPSK), quadrature phase-shift keying (QPSK), M-ary Phase-Shift Keying (M-PSK), and multilevel quadrature amplitude modulation (M-QAM). The data rate, coding, and modulation for each data stream may be determined by instructions performed by a processor 230.

The modulation symbols for all data streams are provided to a Tx MIMO processor 220, which may further process the modulation symbols (e.g., for OFDM). The Tx MIMO processor 220 then provides $N_T$ modulation symbol streams to $N_T$ transmitters (TMTRs) 222a through 222t. In certain embodiments, the Tx MIMO processor 220 applies beamforming weights to the symbols of the data streams and to the antennae from which the symbols are transmitted.

Each transmitter 222 receives and processes a respective symbol stream to provide one or more analog signals, and further conditions (e.g., amplifies, filters, and upconverts) the analog signals to provide a modulated signal suitable for transmission over its corresponding MIMO channel. The $N_T$ modulated signals from the transmitters 222a through 222t are transmitted from the $N_T$ antennae 224a through 224t, respectively.

At the receiver system 250, the transmitted modulated signals are received by $N_R$ antennae 252a through 252r, and the received signal from each antenna 252 is provided to a respective receiver (RCVR) 254a through 254r. Each of the receivers 254 conditions (e.g., filters, amplifies, and downconverts) its respective received signal, digitizes the conditioned signal to provide samples, and further processes the samples to provide a corresponding received symbol stream.

An Rx data processor 260 receives and processes the $N_R$ received symbol streams from the $N_R$ receivers 254, based on a particular receiver processing technique to provide $N_T$ "detected" symbol streams. The Rx data processor 260 then demodulates, deinterleaves, and decodes each detected symbol stream to recover the traffic data of the data stream. The processing by the Rx data processor 260 is complementary to that performed by the Tx MIMO processor 220 and the Tx data processor 214 at the transmitter system 210.

A processor 270 periodically determines which pre-coding matrix to use. The processor 270 formulates a reverse link message comprising a matrix index portion and a rank value portion. The reverse link message may include miscellaneous information regarding the communication link and/or the received data stream.

The reverse link message is then processed by a Tx data processor 238, which also receives traffic data for a number of data streams from a data source 236. The traffic data and the reverse link message are modulated by a modulator 280, conditioned by transmitters 254a through 254r, and transmitted to the transmitter system 210.

At the transmitter system 210, the modulated signals from the receiver system 250 are received by the antennae 224 (which may be the same as or different from the antennae 104-114 shown in FIG. 1), conditioned by receivers 222, demodulated by a demodulator 240, and processed by an Rx data processor 242 to extract the reverse link messages transmitted by the receiver system 250. The processor 230 determines which pre-coding matrix to use for determining the beamforming weights, and processes the extracted message.

OFDMA, SC-FDM, or SC-FDMA FDD transmissions at the access terminal may involve continuous transmission of OFDMA or SC-FDM symbols over time. Under the UMB standard, as one example of a protocol, the access terminal may transmit on all reverse link frames. If the access terminal receives a power control command, a way to adjust the overall power level of the access terminal is to adjust the power amplifier (PA) setting of the access terminal. This adjustment typically occurs at the symbol boundaries.

Figure 3A:
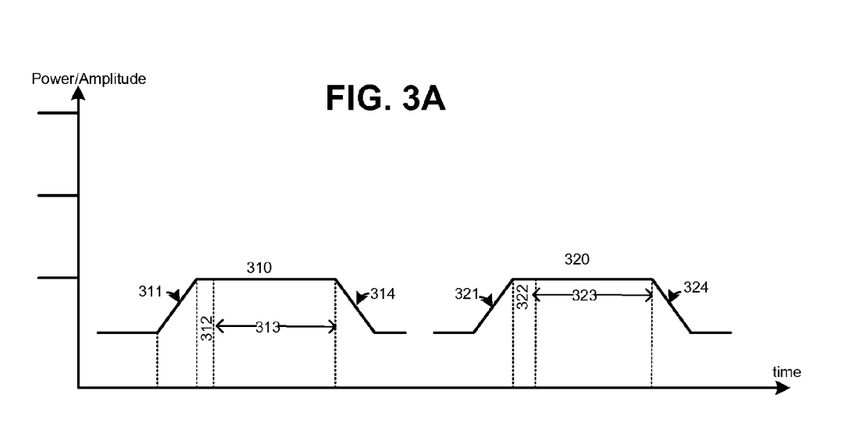
FIGS. 3A, 3B, and 3C illustrate selected features of symbols generated in a terminal for wireless transmission.
Figure 3B:
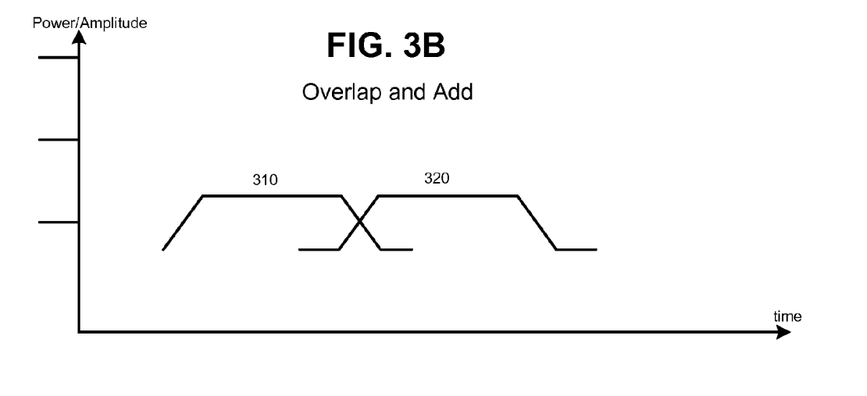
Figure 3C:
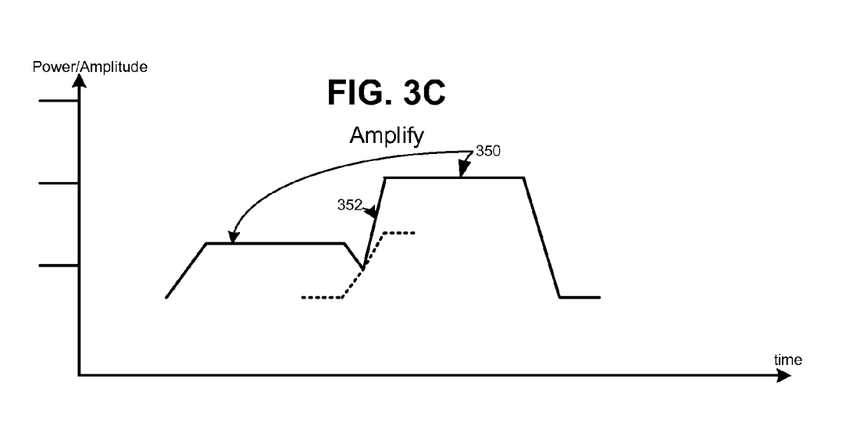

FIGS. 3A, 3B, and 3C illustrate symbols generated in a wireless terminal (e.g., the access terminal receiver 250, though as noted above the methods are not necessarily limited to reverse link power control) for transmission to a base transceiver station (e.g., the BTS transmitter 210). A first symbol 310 includes a preceding overlap portion (symbol window) 311, a cyclic prefix portion 312, an information/payload carrying portion 313, and a following overlap portion (symbol window) 314. A second symbol 320 includes a preceding overlap portion (symbol window) 321, a cyclic prefix portion 322, an information/payload carrying portion 323, and a following overlap portion (symbol window) 324. The symbol windows (preceding and following overlap portions) are generally present to smooth transitions from symbol to symbol and thereby limit spectral content of the transmitted signal.

FIGS. 3A and 3B illustrate the overlap and add process in OFDMA or SC-FDMA transmission. Typically, the following overlap portion (314) of a symbol overlaps entirely or almost entirely with the preceding overlap portion (321) of the immediately next symbol; thus, the following overlap portion 314 and the preceding overlap portion 321 begin at or about the same time. This can be observed in FIG. 3B.

FIG. 3C illustrates one embodiment of power control in a terminal, where the power of the 2nd symbol (320) is increased (relative to the 1st symbol), for example, in response to a power control command from an AP/BTS. The power control is performed in the analog domain on the combined waveform by adjusting the power amplifier (PA) setting at the symbol window boundary, or digitally on the combined waveform by adjusting signal level at the DAC input at the symbol window boundary. Both these schemes result in power adjustments being made after the first symbol 310 and the second symbol 320 go through an overlap-and-add process, to result in the composite symbol 350. This may result in a drastic amplitude transition in the "symbol windowing period", since the second symbol 320 is now significantly higher in amplitude than the first symbol 310. This can be seen in FIG. 3C. In effect, this transition may destroy the intended symbol window shape, causing the spectral content of the composite frames to have higher frequency components, resulting in possible spectral mask violations.

As shown in FIGS. 3A through 3C, the first symbol 310 may be part of a first frame transmitted at a first power level, while the second symbol 320 may be part of a second frame transmitted at a second power level that is higher than the first power level. Thus, the power control of FIG. 3 is performed at a frame boundary, although this is not necessarily a requirement of the invention. The symbols 310 and 320 may be, for example, OFDM symbols SC-FDM, or SC-FDMA symbols. This is also not necessarily a requirement of the invention.

In a frame based communication system, the frames are added in an overlap-and-add process, to generate a waveform that is transmitted, generally after some additional processing. FIG. 3B illustrates the first frame with the first symbol 310 and the second frame with the second symbol 320 being combined in an overlap-and-add process to obtain a combined signal waveform 340. Then, a power control of the combined signal waveform is performed, possibly to increase the power of the second frame 320, resulting in the composite and power adjusted waveform 350 shown in FIG. 3C. Since the second symbol 320 is significantly higher in amplitude than the first symbol 310, the transition 352 between the two symbols is strongly evident in the composite frame 350. The sharpness and the magnitude of the transition 352 may result in excessive spectral spread of the waveform 350, possibly resulting in violations of the applicable spectral mask. This method, however, allows the power amplifier (PA) of the transmitter of the access terminal to operate with a relatively low gain setting, and hence the transmitter of the access terminal can operate more efficiently than a similar transmitter with a similar PA operating at a relatively higher gain setting.

Figure 4A:
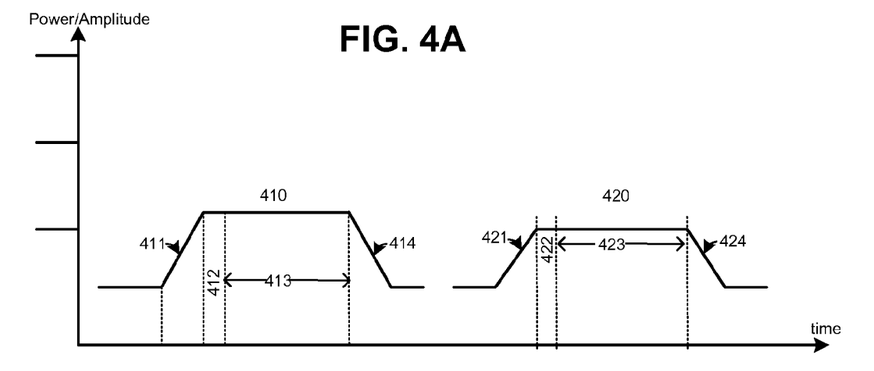
FIGS. 4A, 4B, and 4C illustrate selected features of symbols generated in a terminal for wireless transmission, wherein gain adjustment is applied to the symbols before overlap-and-add processing.
Figure 4B:
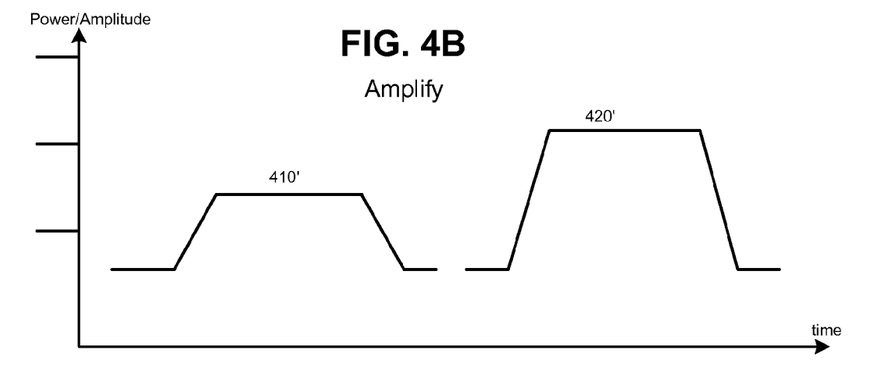
Figure 4C:
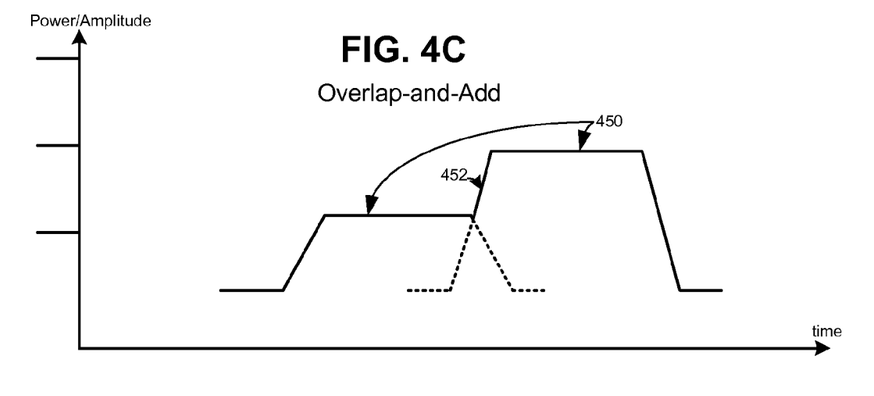

FIGS. 4A, 4B, and 4C illustrate sample symbols in accordance with another embodiment of a transmit power control scheme. FIG. 4A shows a first symbol 410 and a second symbol 420 that are similar or identical to the symbols 310 and 320 of FIG. 3A. The symbol 410 includes a preceding overlap portion 411, a cyclic prefix portion 412, an information/payload carrying portion 413, and a following overlap portion 414. The symbol 420 includes a preceding overlap portion 421, a cyclic prefix portion 422, an information/payload carrying portion 423, and a following overlap portion 424. The preceding and following overlap portions are generally present to smooth transitions from symbol to symbol and prevent spikes in transmitted power and their associated spectral spread of the transmitted signal. FIG. 4B illustrates the power control in this embodiment, where the power of the $2^{nd}$ symbol 420 is increased (relative to the $1^{st}$ symbol 410) in response to a power control command from the AP, or otherwise. In this case, the power adjustment is done prior to the overlap-and-add step, as shown in FIG. 4B. Specifically, the symbol 410' is part of a first frame transmitted at a first power level, while the second symbol 420' is part of a second frame adjusted to be transmitted at a second power level that is higher than the first power level. The symbols 410 and 420 may be, for example, OFDM symbols or SC-FDM symbols. Again, neither the use of OFDM symbols, SC-FDM symbols nor the performance of power control at frame boundary is necessarily a requirement of the invention.

The gain setting for second symbol 420' may be determined in various ways, including based on closed and open loop techniques and commands from a base transceiver station or another controller. As shown in FIG. 4, the gain setting corresponding to the symbol 410 is not adjusted (or adjusted to a different extent than the gain setting corresponding to the symbol 420), so the amplitude of the symbol 410' is the same or substantially the same as that of the symbol 410. After the amplitudes of the symbols 410 and 420 are adjusted in the manner described, the overlap-and-add sequence function module generates a composite waveform 450. Note that the transition between the symbols is less sharp and consequently results in a lower spectral spread of the transmitted signal relative to the spectral spread resulting from transmission of the signal corresponding to the composite waveform 350. Accordingly, power "scaling" of the time-domain OFDM symbol or frame prior to the overlap-and-add stage results in less pronounced high frequency components.

While FIG. 4 illustrate the symbol 420 in the second frame as being the symbol (and frame) subjected to adjustment of the transmit power level, depending on design requirements and frame amplitudes, the first symbol (and its corresponding frame) 410 may also be adjusted. For example, the first symbol (and frame) 410 may be of higher amplitude than the second symbol (and frame) 420. Thus, a different gain setting may be applied to different frames or symbols. Based on the exemplary power control described above, various choices in frame amplification and control can now be achieved while reducing the spectral content in composite frames/symbols. Note that while FIGS. 3 and 4 show only two symbols, typically, many more frames and symbols may be transmitted with multiple power control adjustments in the course of such transmissions.

Figure 5:
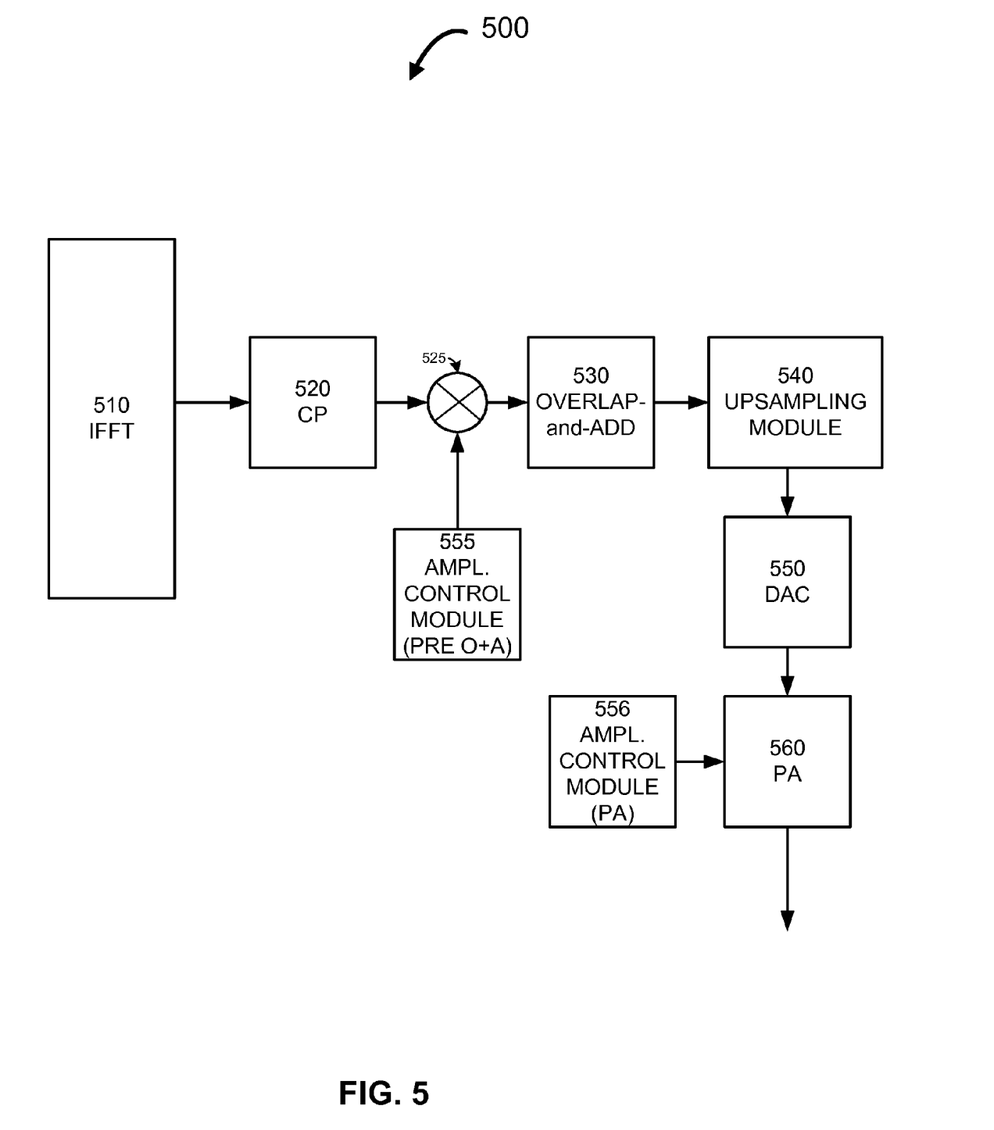
FIG. 5 illustrates in block diagram manner selected components of a wireless device configured to perform power control processes.

FIG. 5 illustrates in a block diagram manner selected components of a wireless device 500 configured to perform the power control processes described throughout this document. The wireless device 500 may be an access terminal, such as the access terminal containing the receiver system 250 of FIG. 2. The illustrated components of the wireless device 500 include an inverse fast Fourier transform (IFFT) engine 510, a cyclic prefix module 520, a scaler 525, an overlap-and-add module 530, an upsampling module 540, a digital-to-analog converter (DAC) 550, and a power amplifier (PA) 560. The components also include a first amplification control module 555 for setting the gain of the scaler 525, and a second amplification control module 556 for setting the gain of the power amplifier 560. It should be noted that various elements and modules of the configuration are not shown in FIG. 5, as they are not necessary for the purposes of this discussion; such omitted modules may, however, be used in various embodiments in accordance with the inventive concepts and their aspects described in this document.

The operation of the IFFT engine 510, cyclic prefix module 520, overlap-and-add module 530, upsampling module 540, DAC 550, and PA 560 should be readily understood after perusal of this document by a person of skill in the art. Briefly, the IFFT engine 510 provides the inverse fast Fourier transform function; the cyclic prefix module 520 generates the cyclic prefix and adds it to a particular frame or symbol; the overlap-and-add module 530 combines the different frames/symbols; the module 540 upsamples the resulting waveform to help properly shape the symbols; the DAC 550 performs conversion of the digital signal into analog form; and the PA 560 provides adjustable power amplification before transmission of the analog signal.

As described in relation to FIG. 4, amplification may be implemented prior to the overlap-and-add module 530. The first amplification control module 555 and the scaler 525 are configured to perform this function. In some variants, the scaler 525 is part of the overlap-and-add module 530, but the scaling or gain adjustment is performed before the overlap-and-add function of the module 530. In other variants, the scaler 525 is a separate device, which also performs the scaling or gain adjustment function before the overlap-and-add function of the module 530. The scaler 525 may be configured to its function digitally.

The second amplification control module 556 may be configured to vary the gain of the PA 560 in a conventional manner. But the amount of the gain adjustment of the PA 560 may differ from the corresponding amount in known systems; another change from known systems may be the decision whether to perform gain adjustment at the PA 560. The adjustments of the PA 560 through the amplification control module 556 may be performed as is discussed above in relation to FIGS. 3A-3C.

Figure 6:
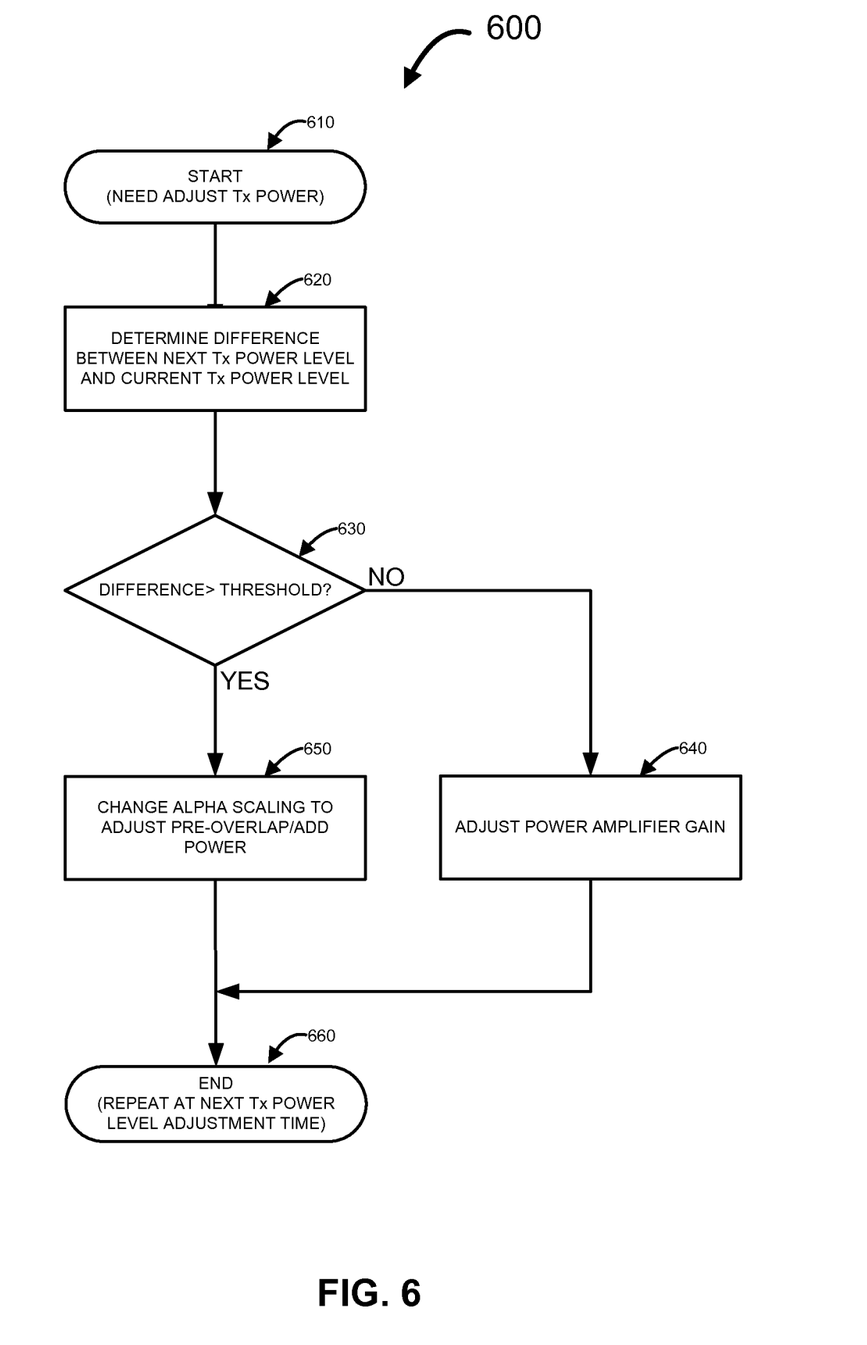
FIG. 6 illustrates selected steps of an exemplary process for adjusting transmit power at a wireless device.

FIG. 6 illustrates selected steps of an exemplary process 600 for adjusting transmit power at a wireless device, such as the access terminal 116 or the access terminal 122. In the process 600, the power gain is adjusted at the PA 560 by the amplification control module 556 when the power level difference from one frame/symbol to the immediately following frame/symbol does not exceed a predetermined threshold value $P_{THRES}$; the power gain is adjusted at the scaler 525 by the amplification control module 555 when the difference exceeds the predetermined threshold value $P_{THRES}$.

The exemplary process 600 begins at a flow point 610, at which point a need has arisen to adjust the transmit power of the access terminal. For example, another process of the access terminal has determined, based on a forward link pilot, that the attenuation, fading, and/or noise from the physical channel between the access terminal and a base transceiver station require an increase in the reverse link transmit power. As another example, the access terminal receives a power control command from the base transceiver station. The time at which the power adjustment is performed may be at the symbol and/or frame boundary.

Process flow of the process 600 then proceeds to step 620 to determine the amplitude or power level difference between successive frames. (We use "frames" here with the assumption that the power control is performed at frame boundaries, but recall that this is not necessarily a requirement of the invention; thus, the power difference may be from symbol to symbol, or possibly between other transmit signal portions.) The determination may be based, for example, on a signal to noise and interference ratio (SINR). The determination may also be simply reception and reading of the value in the power control command transmitted from the base transceiver station, for example. The frames are distinguished in the step 620 as being time-stepped from each other (e.g., (t) versus (t-1), where t is the time index integer indicating transmitted frames). However, any form and notation of sequencing may be used.

After determining the power level difference, the process flow proceeds to decision block 630, where a comparison of the difference and a predetermined threshold value ($P_{THRES}$) is made. The threshold value may be a scalar, signed or unsigned, or other, non-scalar, quantity. The threshold value may be adjustable based on initial setup, operating parameters of the wireless device, current operating parameters of the network within which the device operates, or otherwise. The decision block 630 uses a "greater than" relationship to perform the comparison, but any applicable comparison or value testing method may be used, for example, less than, greater than or equal to, and less than or equal to. A scaler threshold value may correspond, for example, to 0.5 dB, 1 dB, 2, dB, or 3 dB transmit power difference. Other values are also possible.

If the comparison in the decision block 630 results in a determination that the difference does not exceed the predetermined threshold value, then the exemplary process branches to step 640, where power adjustment to the extent of the difference is performed at the PA stage by the module 556. Following the step 640, the process 600 terminates at a flow point 660.

Returning now to the decision block 630, if the comparison results in a determination that the difference does exceed the threshold value $P_{THRES}$, the process flow advances to a power gain adjustment step 650, which was described in relation to FIGS. 4A through 4C. Here, the step 650 uses the term "alpha scaling," which may represent a scalar operation or other operation for increasing or decreasing the frame amplitude/power. The adjustment at the step 650 is equal to the power level difference determined in the step 620. From the step 650, the process flow proceeds to the flow point 660 where the process 600 terminates.

It should be noted that while the above flow chart 600 shows the exemplary process terminating at the flow point 660, in practice, the exemplary process may be repeated, being invoked as needed, or may operate in a continuous/continual loop.

It should also be noted that, in some instances, it may be desirable to reverse the logic of the above process, whereas the test of step 630 is based on a "less than" value rather than a "greater than" value. This may be the case in a testing mode, as one non-limiting example.

Based on the above-described process 600, control of power amplification can be switched between the amplification control modules 555 and 556. In another exemplary process 700 illustrated in FIG. 7, control of power amplification (gain setting) may be performed both at the PA 560 and at the scaler 525. In this process, the amplification is changed at the power amplifier 560 when the difference in the power levels between successive frames (or symbols, as above) does not exceed a first threshold value $P_{THRES1}$. This is similar to the process 600. When the difference in the successive power levels is at or greater than the first threshold value $P_{THRES1}$, the process adjusts the power at both the PA 560 through the amplification control module 556, and at the scaler 525 through the amplification control module 555.

Figure 7:
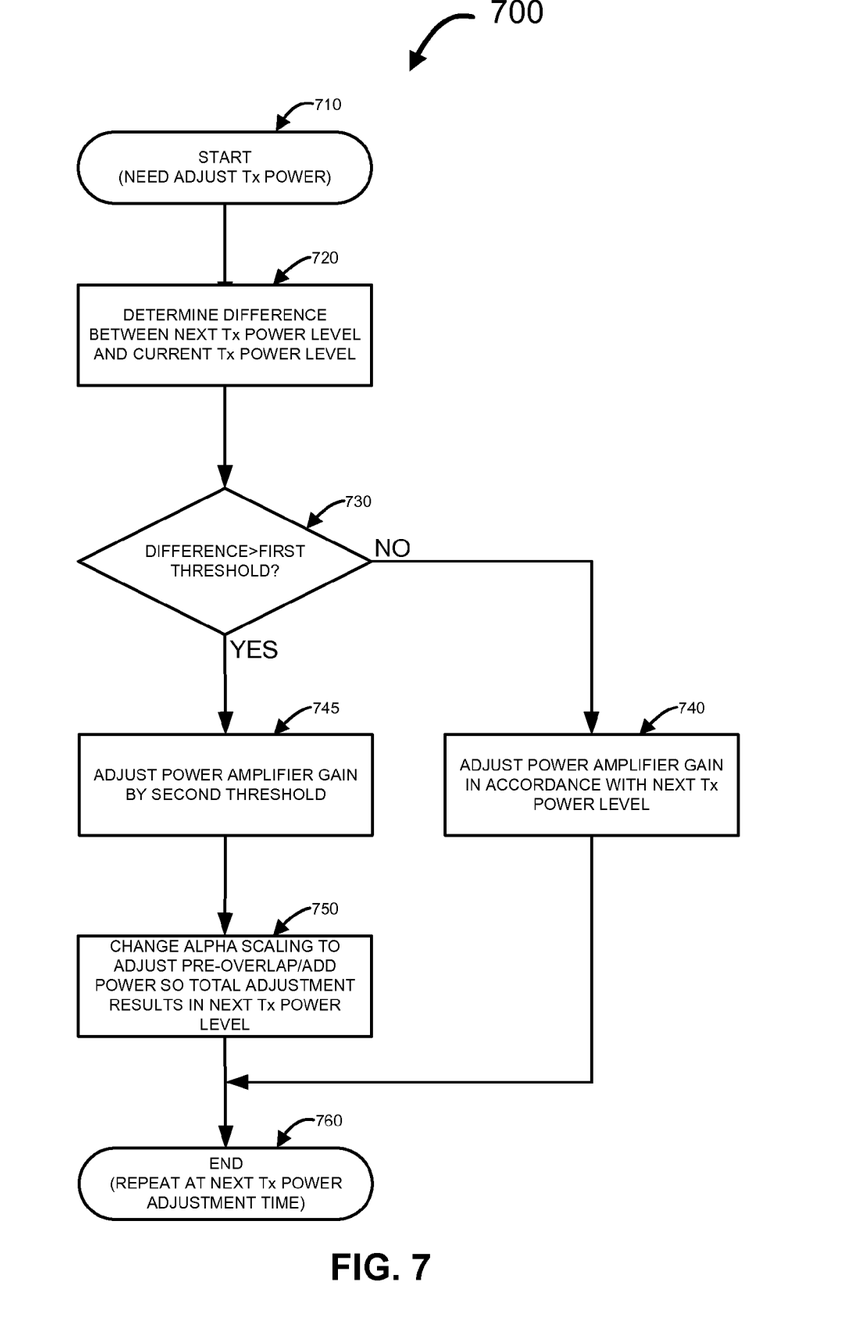
FIG. 7 illustrates selected steps of another exemplary process for adjusting transmit power at a wireless device.

The exemplary process 700 begins at a flow point 710, at which point a need has arisen to adjust the transmit power of the access terminal. For example, another process of the access terminal has determined, based on a forward link pilot, that the attenuation, fading, and/or noise of the physical channel between the access terminal and a base transceiver station require an increase in the reverse link power. As another example, the access terminal has received a power control command from the base transceiver station.

Process flow of the process 700 then proceeds to step 720 to determine the amplitude or power level difference between frames. The determination may be based, for example, on SINR. The determination may also be simply a reading of the value in the power control command received from the base transceiver station, for example.

After determining the power level difference, the process flow of the process 700 proceeds to decision block 730, where a comparison of the difference and a first threshold value ($P_{THRES1}$) is made. The first threshold value may be a scalar, signed or unsigned, or other non-scalar value, and may be adjustable; in short, it is analogous to the threshold value of the process 600. The decision block 730 uses a "greater than" relationship to perform the comparison, but any applicable comparison or value testing method may be used, as discussed above in relation to the step 630 of the process 600.

If the comparison in the decision block 730 results in a determination that the difference does not exceed the predetermined first threshold value, then the exemplary process branches to step 740, where power adjustment is performed at the PA stage by the module 556. Following the step 740, the process 700 terminates at a flow point 760.

If the comparison at the decision block 730 results in a determination that the difference does exceed the first threshold value $P_{THRES1}$, the process flow advances to a power gain adjustment step 745, which is similar to the step 740. Here, however, the power level adjustment at the PA is limited to a second threshold value $P_{THRES2}$. Advantageously, the second threshold value may be the same as or substantially the same as the first threshold value: $P_{THRES1} = P_{THRES2}$. Note that in some variants $P_{THRES1} > P_{THRES2}$, while in other variants $P_{THRES1} < P_{THRES2}$.

From the step 745, process flow proceeds to step 750, which is similar to the step 650 of the process 600 and which was described in relation to FIGS. 4A through 4C. Here, the power adjustment at the step 750 provides a power level adjustment to the extent of the remainder of the power level difference determined in the step 720. In other words, the power adjustment provided at the step 750 is equal or substantially equal to ($P_{DIFF} - P_{THRES2}$), where $P_{DIFF}$ is the difference determined in the step 720. Thus, the combined power adjustment in the steps 745 and 750 is equal or substantially equal to the difference determined in the step 720.

From the step 750, process flow proceeds to the flow point 760 where the process 700 terminates.

Note that the steps 745 and 750 may be interchanged in the execution sequence, or performed simultaneously.

The process 700 may be repeated, being invoked as needed, or may operate in a continuous/continual loop.

Although steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the particular sequences described above and/or shown in the accompanying Figures. Furthermore, not every illustrated step and decision may be required in every system, while some steps and decisions that have not been specifically illustrated may be desirable in some systems.

It should be noted that in aspects, the inventive concepts disclosed may be used on forward links, peer-to-peer links, and in other non-multiple access contexts. It should also be noted that adaptive power control in certain TDD and other non-FDD systems may benefit from the use of the inventive concepts disclosed throughout this document.

Those of skill in the art would understand that the communication techniques that are described in this document may be used for unidirectional traffic transmissions as well as for bidirectional traffic transmissions.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments and variants disclosed herein may be implemented as electronic hardware, computer software, or combinations of both. To show clearly this interchangeability of hardware and software, various illustrative components, blocks, modules, circuits, and steps may have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments and variants disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers and LEDs. Combinations of the above should also be included within the scope of computer-readable media.

The previous description of the disclosed embodiments and variants is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments and variants shown herein, but is to be accorded the widest scope consistent with the principles and novel features disclosed herein.

What is claimed is:

1. A wireless communication method, comprising:
power scaling a first symbol by a first scaling factor to obtain a first scaled symbol, and a second symbol by a second scaling factor to obtain a second scaled symbol;
after power scaling of the first and second symbols, combining the first scaled symbol and the second scaled symbol into a combined signal by an overlap-and-add process;
adjusting at least one of the first scaling factor and the second scaling factor in response to at least one power control event;
processing the combined signal to obtain a processed waveform comprising a first processed symbol corresponding to the first symbol and a second processed symbol corresponding to the second symbol; and
transmitting the processed waveform.

2. The wireless communication method of claim 1, wherein the processing comprises power amplifying the combined signal.

3. The wireless communication method of claim 2, wherein the method is performed at a wireless mobile terminal, the second symbol follows in time the first symbol, and no other symbols are transmitted by the wireless mobile terminal between the first processed symbol and the second processed symbol, the method further comprising receiving from a network a power control command specifying an adjustment value of transmitted power from the wireless mobile terminal.

4. The wireless communication method of claim 3, further comprising:
  comparing the adjustment value to a predetermined threshold, wherein the adjusting is performed in response to the adjustment value having a predetermined relationship with the predetermined threshold.

5. The wireless communication method of claim 4, wherein the network and the wireless mobile terminal communicate using a frequency division duplexing (FDD) communication protocol.

6. The wireless communication method of claim 4, wherein the network and the wireless mobile terminal communicate using an orthogonal frequency division multiplexing (OFDM), orthogonal frequency division multiple access (OFDMA), single-carrier frequency division multiplexing (SC-FDM), or single-carrier frequency division multiple access (SC-FDMA) communication protocol.

7. The wireless communication method of claim 2, wherein the method is performed at a wireless mobile terminal, the second symbol follows in time the first symbol, and no other symbols are transmitted by the wireless mobile terminal between the first processed symbol and the second processed symbol, the method further comprising analyzing a pilot signal transmitted from a network to determine an adjustment value of power transmitted from the wireless mobile terminal.

8. The wireless communication method of claim 7, further comprising comparing the adjustment value to a predetermined threshold, wherein the adjusting is performed in response to the adjustment value having a predetermined relationship with the predetermined threshold.

9. The wireless communication method of claim 8, wherein the network and the wireless mobile terminal communicate using a frequency division duplexing (FDD) communication protocol.

10. The wireless communication method of claim 2, wherein the first symbol is part of a first frame, and the second symbol is part of a second frame, the second frame being different from the first frame.

11. A wireless communication method, comprising:
  comparing a power level adjustment value to a threshold;
  power scaling a first symbol by a first scaling factor to obtain a first scaled symbol;
  setting a second scaling factor equal to the first scaling factor if the power level adjustment value is not greater than the threshold, and setting the second scaling factor to an adjusted scaling factor if the power level adjustment value is greater than the threshold, the adjusted scaling factor being different from the first scaling factor;
  power scaling a second symbol by the second scaling factor to obtain a second scaled symbol;
  combining the first and second scaled symbols into a combined signal by an overlap-and-add process after power scaling of the first and second symbols;
  converting the combined signal into an analog waveform;
  setting a gain of a power amplifier to a first power amplifier value and amplifying a portion of the analog waveform corresponding to the first scaled symbol with the power amplifier when the gain is set to the first power amplifier value to obtain a first amplified portion of the analog waveform;
  setting the gain of the power amplifier to a second power amplifier value and amplifying a portion of the analog waveform corresponding to the second scaled symbol with the power amplifier when the gain is set to the second power amplifier value to obtain a second amplified portion of the analog waveform; and
  transmitting the first and second amplified portions to facilitate transmission of the first amplified portion with a first power level and transmission of the second amplified portion with a second power level;
  wherein a transition from the first power level to the second power level corresponds to the power level adjustment value based upon the first scaling factor, the adjusted scaling factor, and the first and second power amplifier values; and
  wherein a difference between the second power amplifier value and the first power amplifier value does not exceed a predetermined power amplifier difference value.

12. The wireless communication method of claim 11, wherein the predetermined power amplifier difference value corresponds to the threshold.

13. The wireless communication method of claim 12, wherein the method is performed at a wireless mobile terminal, and the transmitting is performed so that the second amplified portion is transmitted following the first amplified portion and no portion of any other symbol is transmitted between the first amplified portion and the second amplified portion, the method further comprising analyzing a pilot signal transmitted from a network to determine the power level adjustment value.

14. The wireless communication method of claim 13, wherein the network and the wireless mobile terminal communicate using a frequency division duplexing (FDD) communication protocol.

15. The wireless communication method of claim 13, wherein the network and the wireless mobile terminal communicate using an orthogonal frequency division multiplexing (OFDM), orthogonal frequency division multiple access (OFDMA), single-carrier frequency division multiplexing (SC-FDM), or single-carrier frequency division multiple access (SC-FDMA) communication protocol.

16. The wireless communication method of claim 15, wherein the first symbol is part of a first frame, and the second symbol is part of a second frame, the second frame being different from the first frame.

17. The wireless communication method of claim 15, further comprising:
  deriving the power level adjustment value from a command received from the network.

18. A wireless device, comprising:
  at least one receiver;
  at least one transmitter; and
  at least one controller coupled to the at least one receiver and the at least one transmitter, wherein the at least one controller is configured to:
  power scale a first symbol by a first scaling factor to obtain a first scaled symbol, and a second symbol by a second scaling factor to obtain a second scaled symbol;
  after power scaling of the first and second symbols, combine the first scaled symbol and the second scaled symbol into a first combined signal by an overlap-and-add process;
  adjust at least one of the first scaling factor and the second scaling factor in response to at least one power control event;
  process the combined signal to obtain a processed waveform comprising a first processed symbol corresponding to the first symbol and a second processed symbol corresponding to the second symbol; and
  transmit the processed waveform.

19. The wireless device of claim 18, wherein the at least one controller is further configured to power amplify the combined signal.

20. The wireless device of claim 19, wherein the second symbol follows in time the first symbol, and no other symbols are transmitted by the wireless device between the first processed symbol and the second processed symbol, the at least one controller is further configured to receive from a network a power control command specifying an adjustment value of power transmitted from the wireless device.

21. The wireless device of claim 20, wherein the at least one controller is further configured to compare the adjustment value to a predetermined threshold, wherein the adjusting is performed in response to the adjustment value having a predetermined relationship with the predetermined threshold.

22. The wireless device of claim 21, wherein the at least one controller is configured to communicate with the network using a frequency division duplexing (FDD) communication protocol.

23. The wireless device of claim 21, wherein the at least one controller is configured to communicate with the network using an orthogonal frequency division multiplexing (OFDM), orthogonal frequency division multiple access (OFDMA), single-carrier frequency division multiplexing (SC-FDM), or single-carrier frequency division multiple access (SC-FDMA) communication protocol.

24. The wireless device of claim 19, wherein the second symbol follows in time the first symbol, and no other symbols are transmitted by the wireless device between the first processed symbol and the second processed symbol, the at least one controller is further configured to analyze a pilot signal transmitted from a network to determine an adjustment value of transmitted power from the wireless device.

25. The wireless device of claim 24, wherein the at least one controller is further configured to compare the adjustment value to a predetermined threshold, and the adjusting is performed in response to the adjustment value having a predetermined relationship with the predetermined threshold.

26. The wireless device of claim 25, wherein the at least one controller is configured to communicate with the network using a frequency division duplexing (FDD) communication protocol.

27. The wireless device of claim 19, wherein the first symbol is part of a first frame, and the second symbol is part of a second frame, the second frame being different from the first frame.

28. A wireless device, comprising:
at least one receiver;
at least one transmitter; and
at least one controller coupled to the at least one receiver and the at least one transmitter, wherein the at least one controller is configured to:
compare a power level adjustment value to a threshold;
power scale a first symbol by a first scaling factor to obtain a first scaled symbol;
set a second scaling factor equal to the first scaling factor if the power level adjustment value is not greater than the threshold, and set the second scaling factor to an adjusted scaling factor if the power level adjustment value is greater than the threshold, the adjusted scaling factor being different from the first scaling factor;
power scale a second symbol by the second scaling factor to obtain a second scaled symbol;
combine the first and second scaled symbols into a combined signal by an overlap-and-add process after power scaling of the first and second symbols;
convert the combined signal into an analog waveform;
set a gain of a power amplifier to a first power amplifier value and amplify a portion of the analog waveform corresponding to the first scaled symbol with the power amplifier when the gain is set to the first power amplifier value to obtain a first amplified portion of the analog waveform;
set the gain of the power amplifier to a second power amplifier value and amplify a portion of the analog waveform corresponding to the second scaled symbol with the power amplifier when the gain is set to the second power amplifier value to obtain a second amplified portion of the analog waveform; and
transmit the first and second amplified portions to facilitate transmission of the first amplified portion with a first power level and transmission of the second amplified portion with a second power level;
wherein a transition from the first power level to the second power level corresponds to the power level adjustment value based upon the first scaling factor, the adjusted scaling factor, and the first and second power amplifier values; and
wherein a difference between the second power amplifier value and the first power amplifier value does not exceed a predetermined power amplifier difference value.

29. The wireless device of claim 28, wherein the predetermined power amplifier difference value corresponds to the threshold.

30. The wireless device of claim 29, wherein the second amplified portion is transmitted following the first amplified portion and no portion of any other symbol is transmitted between the first amplified portion and the second amplified portion, and the at least one controller is further configured to derive the power level adjustment value from a command received from a network.

31. The wireless device of claim 30, wherein the at least one controller is configured to communicate with the network using a frequency division duplexing (FDD) communication protocol.

32. The wireless device of claim 30, wherein the at least one controller is configured to communicate with the network using an orthogonal frequency division multiplexing (OFDM) or orthogonal frequency division multiple access (OFDMA) communication protocol.

33. The wireless device of claim 32, wherein the first symbol is part of a first frame, and the second symbol is part of a second frame, the second frame being different from the first frame.

34. The wireless device of claim 32, wherein, before the comparing, the at least one controller is further configured to analyze a pilot signal transmitted from the network to determine the power level adjustment value.

35. A computer program product, comprising:
a non-transitory computer-readable medium comprising:
code for causing a computer to power scale a first symbol by a first scaling factor to obtain a first scaled symbol, and a second symbol by a second scaling factor to obtain a second scaled symbol;
code for causing the computer to combine the first scaled symbol and the second scaled symbol into a combined signal by an overlap-and-add process after power scaling of the first and second symbols;
code for causing the computer to adjust at least one of the first scaling factor and the second scaling factor in response to at least one power control event;
code for causing the computer to process the combined signal to obtain a processed waveform comprising a first processed symbol corresponding to the first symbol and a second processed symbol corresponding to the second symbol; and code for causing the computer to transmit the processed waveform.

36. A computer program product, comprising:

a non-transitory computer-readable medium comprising:

code for causing a computer to compare a power level adjustment value to a threshold;

code for causing the computer to power scale a first symbol by a first scaling factor to obtain a first scaled symbol;

code for causing the computer to set a second scaling factor equal to the first scaling factor if the power level adjustment value is not greater than the threshold, and set the second scaling factor to an adjusted scaling factor if the power level adjustment value is greater than the threshold, the adjusted scaling factor being different from the first scaling factor;

code for causing the computer to power scale a second symbol by the second scaling factor to obtain a second scaled symbol;

after power scaling of the first and second symbols, code for causing the computer to combine the first and second scaled symbols into a combined signal by an overlap-and-add process;

code for causing the computer to convert the combined signal into an analog waveform;

code for causing the computer to set a gain of a power amplifier to a first power amplifier value and amplify a portion of the analog waveform corresponding to the first scaled symbol with the power amplifier when the gain is set to the first power amplifier value to obtain a first amplified portion of the analog waveform;

code for causing the computer to set the gain of the power amplifier to a second power amplifier value and amplify a portion of the analog waveform corresponding to the second scaled symbol with the power amplifier when the gain is set to the second power amplifier value to obtain a second amplified portion of the analog waveform; and code for causing the computer to transmit the first and second amplified portions to facilitate transmission of the first amplified portion with a first power level and transmission of the second amplified portion with a second power level;

wherein a transition from the first power level to the second power level corresponds to the power level adjustment value based upon the first scaling factor, the adjusted scaling factor, and the first and second power amplifier values; and wherein a difference between the second power amplifier value and the first power amplifier value does not exceed a predetermined power amplifier difference value.

37. A wireless device, comprising:

means for power scaling a first symbol by a first scaling factor to obtain a first scaled symbol, and a second symbol by a second scaling factor to obtain a second scaled symbol;

means for combining the first scaled symbol and the second scaled symbol into a combined signal by an overlap-and-add process after power scaling of the first and second symbols;

means for adjusting at least one of the first scaling factor and the second scaling factor in response to at least one power control event;

means for processing the combined signal to obtain a processed waveform comprising a first processed symbol corresponding to the first symbol and a second processed symbol corresponding to the second symbol; and means for transmitting the processed waveform.

38. A wireless device, comprising:

means for comparing a power level adjustment value to a threshold;

means for power scaling a first symbol by a first scaling factor to obtain a first scaled symbol;

means for setting a second scaling factor equal to the first scaling factor if the power level adjustment value is not greater than the threshold, and means for setting the second scaling factor to an adjusted scaling factor if the power level adjustment value is greater than the threshold, the adjusted scaling factor differing from the first scaling factor;

means for power scaling a second symbol by the second scaling factor to obtain a second scaled symbol;

means for combining the first and second scaled symbols into a combined signal by an overlap-and-add process after power scaling of the first and second symbols;

means for converting the combined signal into an analog waveform;

means for setting a gain of a power amplifier to a first power amplifier value and means for amplifying a portion of the analog waveform corresponding to the first scaled symbol with the power amplifier when the gain is set to the first power amplifier value to obtain a first amplified portion of the analog waveform;

means for setting the gain of the power amplifier to a second power amplifier value and means for amplifying a portion of the analog waveform corresponding to the second scaled symbol with the power amplifier when the gain is set to the second power amplifier value to obtain a second amplified portion of the analog waveform; and means for transmitting the first and second amplified portions to facilitate transmission of the first amplified portion with a first power level and transmission of the second amplified portion with a second power level;

wherein a transition from the first power level to the second power level corresponds to the power level adjustment value based upon the first scaling factor, the adjusted scaling factor, and the first and second power amplifier values; and wherein a difference between the second power amplifier value and the first power amplifier value does not exceed a predetermined power amplifier difference value.

* * * * *